(12) United States Patent
Iwazaki et al.

(10) Patent No.: US 7,069,129 B2
(45) Date of Patent: Jun. 27, 2006

(54) DRIVING SUPPORT SYSTEM AND METHOD

(75) Inventors: Katsuhiko Iwazaki, Numazu (JP); Seiji Kawakami, Susono (JP); Satoru Niwa, Susono (JP); Hiroaki Kataoka, Susono (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/134,318

(22) Filed: May 23, 2005

(65) Prior Publication Data
US 2005/0267661 A1 Dec. 1, 2005

(30) Foreign Application Priority Data
May 31, 2004 (JP) .......................... P2004-161612

(51) Int. Cl.
A01B 69/00 (2006.01)

(52) U.S. Cl. .......................... 701/41; 701/42; 180/168; 340/439; 348/119

(58) Field of Classification Search ............. 701/41, 701/42; 180/167–169; 340/435, 438, 439; 348/119
See application file for complete search history.

(56) References Cited

U.S. PATENT DOCUMENTS

| 5,373,911 A * | 12/1994 | Yasui .......................... 180/168 |
| 5,765,116 A | 6/1998 | Wilson-Jones et al. |
| 6,005,492 A * | 12/1999 | Tamura et al. ............... 340/937 |
| 6,053,270 A * | 4/2000 | Nishikawa et al. ......... 180/168 |
| 6,070,112 A * | 5/2000 | Sato et al. ..................... 701/41 |
| 6,092,619 A * | 7/2000 | Nishikawa et al. ......... 180/446 |
| 6,134,491 A | 10/2000 | Kawagoe et al. |
| 6,198,992 B1 * | 3/2001 | Winslow ..................... 701/23 |
| 6,212,453 B1 | 4/2001 | Kawagoe et al. |

FOREIGN PATENT DOCUMENTS

| JP | A 07-104850 | 4/1995 |
| JP | A 09-240502 | 9/1997 |
| JP | A 2001-010518 | 1/2001 |

* cited by examiner

Primary Examiner—Richard M. Camby
(74) Attorney, Agent, or Firm—Oliff & Berridge, PLC

(57) ABSTRACT

A driving support system according to the present invention is provided with an actuator for steering steered wheels and performs a driving support control of a vehicle to apply an additional torque to a steering mechanism incorporating the steered wheels, by means of the actuator to steer the steered wheels. The driving support system has an image taking device for taking a forward image ahead the vehicle, a controller for driving the actuator to generate the torque on the steering mechanism on the basis of the forward image acquired by the image taking device, to perform the driving support control, a steering wheel torque detector for detecting a steering wheel torque on a steering wheel, and a control suppressor for prioritizing a steering operation by a driver to the driving support control when a magnitude of the steering wheel torque is not less than a predetermined value. The control suppressor sets the predetermined value so that the predetermined value in a case where a direction of the steering torque for the driving support control agrees with a direction of the steering wheel torque by the driver is larger than the predetermined value in a case where the direction of the steering torque does not agree with the direction of the steering wheel torque. This configuration enables the system to accurately grasp a driver's intension and to prioritize the steering operation by the driver more accurately when the steering operation by the driver should be prioritized to the driving support control.

16 Claims, 2 Drawing Sheets

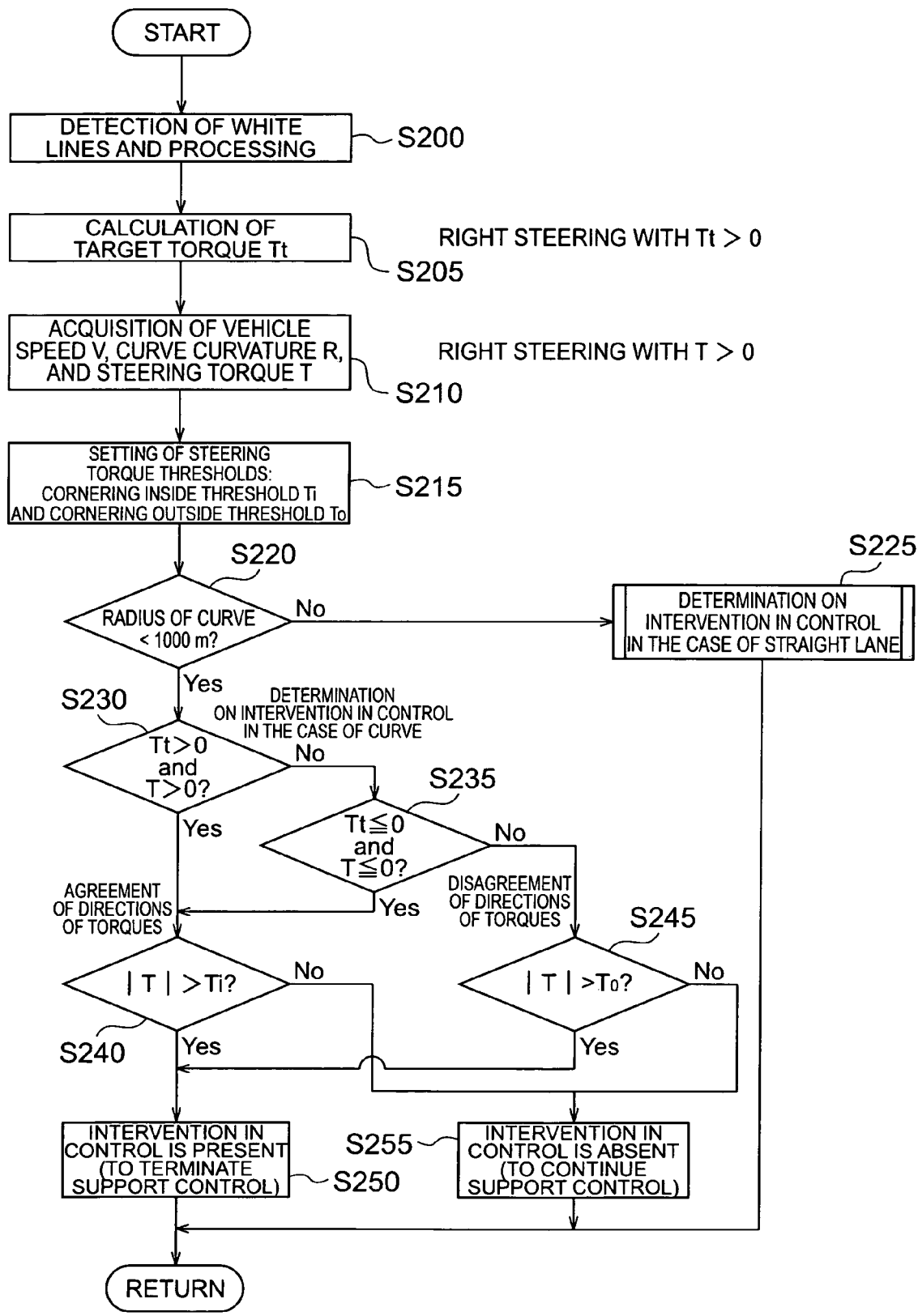

DRIVING SUPPORT SYSTEM AND METHOD

BACKGROUND OF THE INVENTION

1. Field of the Invention

The present invention relates to a driving support system (method) with an actuator for steering steered wheels of a vehicle, which supports driving of the vehicle by means of the actuator.

2. Related Background of the Invention

There are known driving support systems (method) arranged to take a forward image ahead a vehicle with a camera or the like, to detect a driving route of the vehicle on the basis of the taken image or video, and to support driving so as to prevent the vehicle from departing from the driving route, and they started to be mounted on commercially available cars. Such driving support systems are called lane keep (assist) systems or the like, and include those for simply drawing driver's attention in the event of a departure from the driving route, and those for actuating an actuator to steer the steered wheels in the event of a departure from the driving route (or assist steering), and thereby correct the departure from the driving route. An example of the latter is the one described in Japanese Patent Application Laid-Open No. 7-104850.

SUMMARY OF THE INVENTION

The above-stated Application describes that a steering operation by a driver is prioritized when the steering operation by the driver is carried out during the lane keep control (i.e., with intervention of the driver). It can be contemplated in this case that the control is carried out so as to prioritize the steering operation by the driver when the driver applies a steering wheel torque of not less than a predetermined value to the steering system. However, depending upon whether the direction of the steering torque applied by the lane keep control is identical with or different from the direction of the steering wheel torque applied by the driver's operation, the driver's operation becomes more likely or less likely to be prioritized. This poses the problem that the steering control of the driving support by the actuator becomes frequently stopped or rarely stopped, and thus there was a desire for improvement. Therefore, an object of the present invention is to provide a driving support system capable of prioritizing the driver's steering operation more accurately when the driver's steering operation should be prioritized to the driving support control.

A driving support system according to the present invention is an apparatus with an actuator for steering a steered wheel, which performs a driving support control of a vehicle to apply an additional torque to a steering mechanism incorporating the steered wheel, by means of the actuator to steer the steered wheel, the driving support system comprising: image taking means for taking a forward image ahead the vehicle; controlling means for determining the additional torque to be applied to the steering mechanism on the basis of the forward image acquired by the image taking means and for driving the actuator so as to generate the determined torque, thereby performing the driving support control; steering wheel torque detecting means for detecting a steering wheel torque applied on a steering wheel by a driver; and control suppressing means for prioritizing a steering operation by the driver to the driving support control when a magnitude of the steering wheel torque detected by the steering wheel torque detecting means is not less than a predetermined value, wherein the control suppressing means sets the predetermined value so that the predetermined value in a case where a direction of the steering torque for the driving support control determined by the controlling means agrees with a direction of the steering wheel torque detected by the steering wheel torque detecting means is larger than the predetermined value in a case where the direction of the steering torque does not agree with the direction of the steering wheel torque.

In the driving support system of the present invention, the predetermined value in the case where the direction of the steering torque for the driving support control determined by the controlling means agrees with the direction of the steering wheel torque detected by the steering wheel torque detecting means (i.e., a steering torque based on a driver's steering operation) is set larger than the predetermined value in the case where they do not agree. The case where the aforementioned two steering torques agree with each other means that the steering direction by the driving support control agrees with the direction of the steering operation by the driver. On the other hand, the case where the two steering torques do not agree means that the steering direction by the driving support control is different from the direction of the steering operation by the driver.

Where the directions of the two steering torques are different, it can be relatively definitely detected that the driver desires a control opposite to the driving support control. On the other hand, where the directions of the two steering torques agree with each other, the driver desires more steerage than the steerage by the driving support control, but it is difficult to detect it because the directions of steerage (steering operations) are the same. Therefore, the present invention involves setting the small predetermined value for the determination in the former case where the detection is relatively easy, and, in other words, setting the large predetermined value in the latter case, thereby enabling secure achievement of the detection of the both cases. This configuration permits the system to accurately grasp a driver's intension and to prioritize the driver's steering operation more accurately when the driver's steering operation should be prioritized to the driving support control.

Preferably, the control suppressing means terminates the driving support control when the steering wheel torque detected by the steering wheel torque detecting means is not less than the predetermined value. It can be contemplated that the steering torque for the driving support control is reduced on the occasion of prioritizing the driver's steering operation, or that the steering torque for the driving support control is completely nullified on that occasion (i.e., the driving support control is released). The driving support control is terminated herein to securely prioritize the driver's operation.

Furthermore, preferably, the system further comprises vehicle speed detecting means for detecting a speed of the vehicle, and the control suppressing means variably controls the predetermined value in accordance with the vehicle speed detected by the vehicle speed detecting means, and sets the predetermined value so that the predetermined value increases with increase in the vehicle speed. Where the predetermined value is variably controlled according to the vehicle speed in this manner, the predetermined value in the case where the direction of the steering torque for the driving support control determined by the controlling means agrees with the direction of the steering wheel torque detected by the steering wheel torque detecting means (i.e., the steering torque by the driver's steering) is set larger than the predetermined value in the case where they do not agree, under the condition of the same vehicle speed.

In other words, the predetermined value is variably controlled according to the vehicle speed detected by the vehicle speed detecting means, and the predetermined value serving as a determination threshold is set to increase with increase in the vehicle speed. Namely, as the vehicle speed increases, the driver needs to provide a greater steering torque in order to make a determination that there is intervention by the driver in the control. During driving on a curve, the steering wheel torque necessary for cornering increases with increase in the vehicle speed. Therefore, the frequent stop of the control can be avoided by setting the threshold higher on the basis of the vehicle speed.

Furthermore, preferably, the controlling means detects a parameter associated with a curvature of a curve ahead the vehicle on the basis of the forward image acquired by the image taking means, and the control suppressing means variably controls the predetermined value in accordance with the parameter associated with the curvature of the curve, and sets the predetermined value so that the predetermined value increases with increase in the curvature of the curve. Where the predetermined value is variably controlled according to the parameter associated with the curvature of the curve in this manner, the predetermined value in the case where the direction of the steering torque for the driving support control determined by the controlling means agrees with the direction of the steering wheel torque detected by the steering wheel torque detecting means (i.e., the steering torque by the driver's steering) is set larger than the predetermined value in the case where they do not agree, under the condition of the same curvature of the curve. Since the curvature is simply inverse to the radius of the curvature, the operation to determine the radius of curvature of the curve is equivalent to the operation to determine the curvature of the curve.

In this configuration, the predetermined value is variably controlled according to the curvature of the curve detected by the controlling means, and the predetermined value as a determination threshold is set to increase with increase in the curvature of the curve. A large curvature of a curve means that the curve is tight, and a greater steer angle is necessary as the curvature of the curve increases. Namely, unless the driver gives a greater steer angle with increase in the curvature of the curve, a determination that there occurs intervention in the control by the driver is not made, whereby the driver's steering operation can be prioritized more accurately when the driver's steering operation should be prioritized to the driving support control.

A driving support method according to the present invention is a method with an actuator for steering a steered wheel by means of an actuator to apply an additional torque to a steering mechanism incorporating the steered wheel; wherein a forward image ahead the vehicle is taken; the additional torque to be applied to the steering mechanism is determined on the basis of the forward image acquired and thereby the driving support control is performed so as to generate the determined torque with the actuator; a steering wheel torque applied on a steering wheel by a driver is detected; and a steering operation by the driver to the driving support control is prioritized when a magnitude of the steering wheel torque detected by the steering wheel torque detecting means is not less than a predetermined value, wherein the predetermined value is set so that the predetermined value in a case where a direction of the steering torque for the driving support control agrees with a direction of the steering wheel torque is larger than the predetermined value in a case where the direction of the steering torque does not agree with the direction of the steering wheel torque.

In the driving support method of the present invention, the predetermined value in the case where the direction of the steering torque for the driving support control agrees with the direction of the steering wheel torque (i.e., a steering torque based on a driver's steering operation) is set larger than the predetermined value in the case where they do not agree. The case where the aforementioned two steering torques agree with each other means that the steering direction by the driving support control agrees with the direction of the steering operation by the driver. On the other hand, the case where the two steering torques do not agree means that the steering direction by the driving support control is different from the direction of the steering operation by the driver.

Where the directions of the two steering torques are different, it can be relatively definitely detected that the driver desires a control opposite to the driving support control. On the other hand, where the directions of the two steering torques agree with each other, the driver desires more steerage than the steerage by the driving support control, but it is difficult to detect it because the directions of steerage (steering operations) are the same. Therefore, the present invention involves setting the small predetermined value for the determination in the former case where the detection is relatively easy, and, in other words, setting the large predetermined value in the latter case, thereby enabling secure achievement of the detection of the both cases. This configuration permits the system to accurately grasp a driver's intension and to prioritize the driver's steering operation more accurately when the driver's steering operation should be prioritized to the driving support control.

Preferably, the driving support control is terminated when the steering wheel the steering torque is not less than the predetermined value. It can be contemplated that the steering torque for the driving support control is reduced on the occasion of prioritizing the driver's steering operation, or that the steering torque for the driving support control is completely nullified on that occasion (i.e., the driving support control is released). The driving support control is terminated herein to securely prioritize the driver's operation.

Furthermore, preferably, a speed of the vehicle is detected, and the predetermined value is variably controled in accordance with the vehicle speed, and the predetermined value is set so that the predetermined value increases with increase in the vehicle speed. Where the predetermined value is variably controlled according to the vehicle speed in this manner, the predetermined value in the case where the direction of the steering torque for the driving support control agrees with the direction of the steering wheel torque (i.e., the steering torque by the driver's steering) is set larger than the predetermined value in the case where they do not agree, under the condition of the same vehicle speed.

In other words, the predetermined value is variably controlled according to the vehicle speed, and the predetermined value serving as a determination threshold is set to increase with increase in the vehicle speed. Namely, as the vehicle speed increases, the driver needs to provide a greater steering torque in order to make a determination that there is intervention by the driver in the control. During driving on a curve, the steering wheel torque necessary for cornering increases with increase in the vehicle speed. Therefore, the frequent stop of the control can be avoided by setting the threshold higher on the basis of the vehicle speed.

Furthermore, preferably, a parameter is detected associated with a curvature of a curve ahead the vehicle on the basis of the forward image acquired, and the predetermined value is variably controled in accordance with the parameter associated with the curvature of the curve, and sets the predetermined value so that the predetermined value increases with increase in the curvature of the curve. Where the predetermined value is variably controlled according to the parameter associated with the curvature of the curve in this manner, the predetermined value in the case where the direction of the steering torque for the driving support control agrees with the direction of the steering wheel torque (i.e., the steering torque by the driver's steering) is set larger than the predetermined value in the case where they do not agree, under the condition of the same curvature of the curve. Since the curvature is simply inverse to the radius of the curvature, the operation to determine the radius of curvature of the curve is equivalent to the operation to determine the curvature of the curve.

In this configuration, the predetermined value is variably controlled according to the curvature of the curve, and the predetermined value as a determination threshold is set to increase with increase in the curvature of the curve. A large curvature of a curve means that the curve is tight, and a greater steer angle is necessary as the curvature of the curve increases. Namely, unless the driver gives a greater steer angle with increase in the curvature of the curve, a determination that there occurs intervention in the control by the driver is not made, whereby the driver's steering operation can be prioritized more accurately when the driver's steering operation should be prioritized to the driving support control.

BRIEF DESCRIPTION OF THE DRAWINGS

FIG. 2 is a flowchart of a driving support control (lane keep control) according to an embodiment of the driving support system of the present invention.

DESCRIPTION OF THE PREFERRED EMBODIMENTS

Figure 1:
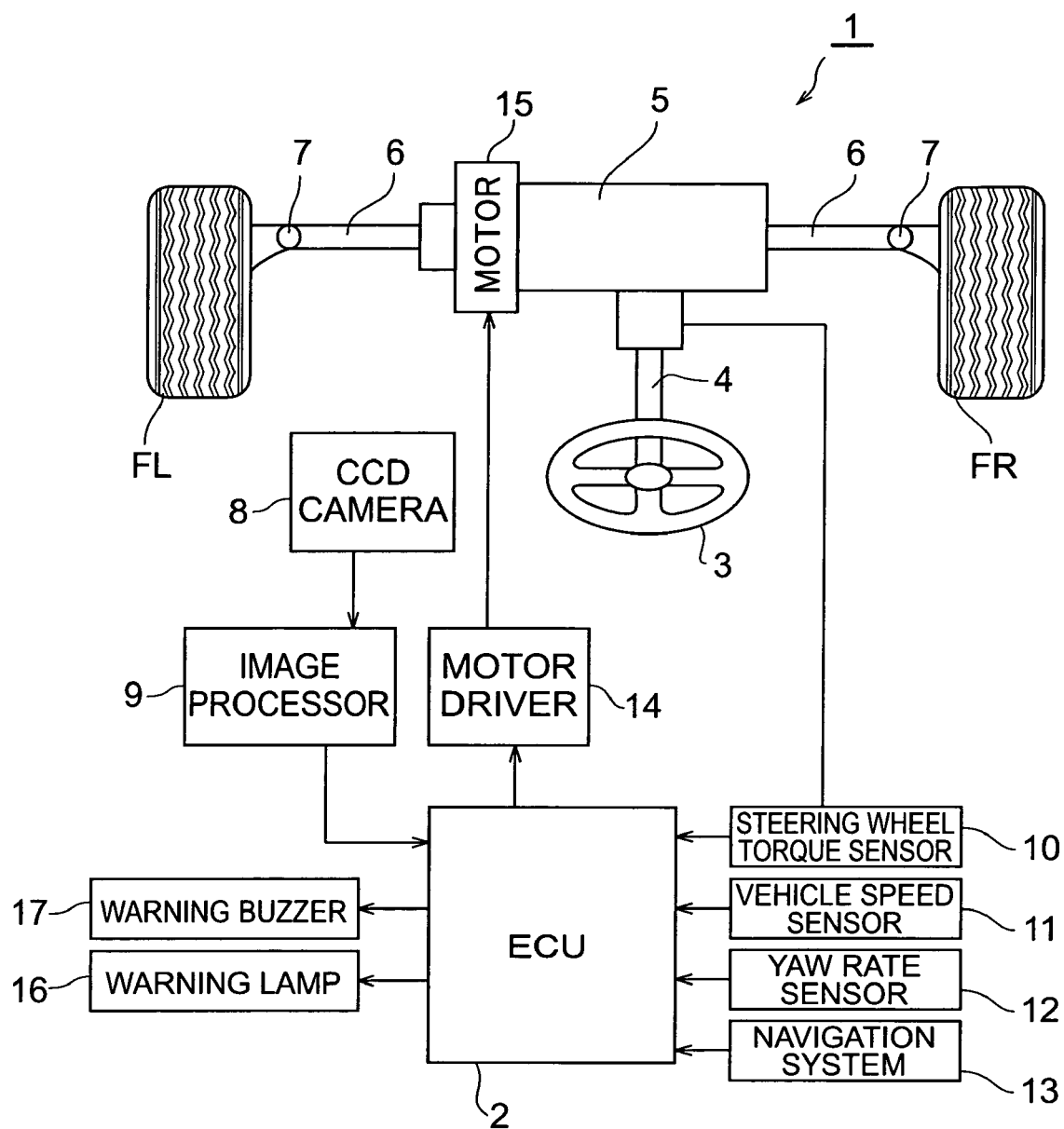
FIG. 1 is a configuration diagram of a vehicle equipped with an embodiment of the driving support system according to the present invention.

An embodiment of the driving support system according to the present invention will be described below. FIG. 1 shows a configuration diagram of vehicle 1 provided with the driving support system of the present embodiment. The vehicle 1 has an electronic control unit (ECU) 2, and ECU 2 controls a driving support (lane keep control). As shown in FIG. 1, the vehicle 1 has a steering wheel 3. The steering wheel 3 is installed in an interior of the vehicle 1, and, when the driver manipulates the steering wheel, it results in steering steered wheels (front right and left road wheels FR, FL herein). The steering wheel 3 is fixed to one end of steering shaft 4. The steering shaft 4 rotates in conjunction with rotation of the steering wheel 3.

A rack bar 6 is coupled through steering gear box 5 to the other end of the steering shaft 4. The steering gear box 5 has a function of transforming a rotational motion of the steering shaft 4 to a translational motion of the rack bar 6 along its axial direction. The both ends of rack bar 6 are coupled through a knuckle arm 7 to respective hub carriers of the wheels FL, FR. In this configuration, with rotation of the steering wheel 3, the wheels FL, FR are steered through the steering shaft 4 and steering gear box 5 (rack bar 6).

A CCD camera 8 for taking a forward image is incorporated in an interior mirror. The CCD camera 8 images surrounding circumstances in a predetermined region ahead the vehicle 1. An image processor 9 is connected to the CCD camera 8. Image data of surrounding circumstances taken by the CCD camera 8 is supplied to the image processor 9. The image processor 9 subjects the image data taken by the CCD camera 8, to image processing, and detects a lane (driving route) on the basis of white lines or the like drawn on a road on which the vehicle 1 is running. In the taken image or video the luminance difference is large between the road surface and white lines drawn thereon, and it is thus relatively easy to detect the white lines, which is convenient in detecting the lane ahead the vehicle.

The image processor 9 is connected to the aforementioned ECU 2. The image processor 9 detects a curvature (1/R) of a curve of the forward driving route, an offset D of vehicle 1 relative to the lane, and a yaw angle $\theta$ by arithmetic operation, based on the detected lane, and sends the result to ECU 2. Methods of detecting the various information contents (the curve curvature (1/R) and the offset D and yaw angle $\theta$ of the host vehicle) about the forward driving route on the basis of the image can be selected from the well-known methods.

The offset D is also called a lateral deviation amount or the like, and is a value indicating a lateral deviation (offset) of the vehicle relative to the driving route. The offset D is determined based on appropriate measures, such as the center line, and the center line of the driving lane. The yaw angle $\theta$ is also called an angle of deflection, and is a value indicating a traveling direction of the vehicle relative to the driving route. In the present embodiment the CCD camera 8 functions as an image taking means and the image processor 9 as a detecting means. Another potential configuration is such that the image processor 9 performs processing of the image to a certain degree and thereafter sends it to ECU 2, and the ECU 2 performs the arithmetic operation to obtain the curvature (1/R), offset D, and yaw angle $\theta$. In this case, ECU 2 functions as a detecting means.

A steering wheel torque sensor 10 and a vehicle speed sensor 11 are also connected to ECU 2. The steering wheel torque sensor 10 outputs a signal according to a steering wheel torque on the steering wheel 3 manipulated by the driver. The steering wheel torque sensor 10 functions as a steering wheel torque detecting means. A steer angle sensor or the like can also be provided in addition to the steering wheel torque sensor 10. The steer angle sensor detects a steer angle of the steering wheel. The vehicle speed sensor 11 consists of wheel speed sensors mounted on the respective wheels and generates pulse signals in a period according to a speed of the vehicle 1. The vehicle speed sensor 11 functions as a vehicle speed detecting means. It is also possible to mount a sensor for detecting a longitudinal acceleration of the vehicle, as a vehicle speed detecting means and to obtain the vehicle speed by integrating the output from the sensor over time. The output signal from the steering wheel torque sensor 10 and the output signal from the vehicle speed sensor 11 are supplied each to ECU 2. ECU 2 detects the steer wheel torque on the basis of the output signal from the steering wheel torque sensor 10 and detects the vehicle speed on the basis of the output signal from the vehicle speed sensor 11.

In addition, a yaw rate sensor 12 and a navigation system 13 are also connected to ECU 2. The yaw rate sensor 12 is placed near the center of gravity of the vehicle 1 and is configured to detect the yaw rate around the vertical axis at the center of gravity and send the detection result to ECU 2.

The navigation system 13 is a device for detecting the position of the vehicle 1 by use of GPS or the like. The navigation system 13 also has a function of detecting circumstances such as the curvature (1/R) of a curve, the gradient, etc. ahead the vehicle 1. ECU 2 grasps the position of the vehicle 1 and the circumstances of the road anticipated during driving, by means of the navigation system 13.

Furthermore, a motor driver 14 is also connected to ECU 2. A motor (actuator) 15 disposed on the aforementioned steering gear box 5 is connected to the motor driver 14. Although not illustrated, a ball screw groove is formed in a partial region of the outer peripheral surface of the rack bar 6, and a ball nut having a ball screw groove corresponding to the ball screw groove of the rack bar, on its inner peripheral surface is fixed to a rotor of the motor 15. A plurality of bearing balls are set between the pair of ball screw grooves, and with actuation of the motor 15 the rotor rotates to assist axial movement of the rack bar 6, i.e., steering.

The motor driver 14 supplies a drive current to motor 15 in accordance with a command signal from ECU 2. The motor 15 applies a steering torque according to the drive current supplied from the motor driver 14, to the rack bar 6. ECU 2 supplies a command signal to motor driver 14 in accordance with a logic described later, to drive the motor 15 and thereby displace the rack bar 6, so as to steer the wheels FL, FR.

A warning lamp 16 and a warning buzzer 17 are connected to ECU 2. The warning lamp 16 is located at a position where the occupant in the interior can visually recognize the lamp, and lights up according to a command signal from ECU 2. The warning buzzer 17 emits a sound to the interior according to a command signal from ECU 2. ECU 2 actuates the warning lamp 16 and warning buzzer 17 according to a logic described later, to draw occupant's attention.

The lane keep control (driving support control) will be briefly described. The lane keep control of the present embodiment is an assist system which makes the actuator not generate the entire steering torque necessary for keeping the lane, but generate a torque below the necessary steering torque to encourage the driver to perform a steering operation. For this reason, the driver needs to apply an additional steering torque through the use of the steering wheel 3 in order to keep the lane. Therefore, it is difficult to determine whether the driver performs the steering operation according to the lane keep control, or whether the driver intervenes in the control (a case where the driver performs the steering operation over the lane keep control, or a case where the driver performs the steering operation against the lane keep control).

It is noted that the driving support control of the present invention is also applicable to the lane keep control to make the actuator generate the entire steering torque necessary for keeping the lane, of course. In this case, a determination on whether the driver intervenes in the control can be made easier than in the aforementioned case, because there is no steering torque to be given by the driver in order to keep the lane. However, a technique similar to the technique described below can also be applied to this case, whereby the steering operation by the driver can be prioritized more accurately when the driver's steering operation should be prioritized to the driving support control.

In the lane keep control, first, CCD camera 8 acquires a forward image ahead the vehicle 1, and the curve curvature (1/R), offset D, and yaw angle θ are detected from the image. The offset D is also called a lateral deviation amount or the like and is a value indicating a lateral deviation (offset) of the vehicle relative to the driving route. The offset D is determined based on appropriate measures such as the center line, and the center line of the driving lane. The yaw angle θ is also called an angle of deflection and is a value indicating the traveling direction of the vehicle relative to the driving route.

A yaw rate $\omega_T$ necessary for the vehicle 1 to travel along the curve is determined based on the curvature (1/R) of the curve ahead the vehicle 1. The ECU also acquires a yaw rate $\omega_d$ necessary for adjusting the current offset D of the host vehicle 1 to a target offset $D_0$. Similarly, the ECU acquires a yaw rate $\omega_\theta$ necessary for adjusting the current yaw angle θ of the host vehicle 1 to a target yaw angle $\theta_0$. Then the ECU obtains a target yaw rate ω by summing up these $\omega_T$, $\omega_d$, and $\omega_\theta$. When the target yaw rate ω is generated in the vehicle, the vehicle 1 can travel along the forward curve and the offset D and yaw angle θ thereof can converge to their respective target values.

A relation of G=Vω/g (g is the gravitational acceleration) holds between the yaw rate ω and the lateral acceleration G, and if the vehicle speed V is constant, the yaw rate ω and the lateral acceleration G are in one-to-one correspondence. The ECU calculates a steering torque for generating the determined yaw rate ω (or the lateral acceleration G corresponding thereto), i.e., a controlled variable of the motor 15, and the motor 15 is driven on the basis thereof. In consequence, the vehicle 1 is prevented from departing from the lane, and thus travels as keeping the lane.

In the lane keep control of the present embodiment, as described above, it is determined whether the driver intervenes in the control, and the control is terminated when it is determined that there is intervention in the control. At this time, the predetermined value as a determination threshold is variably controlled, depending upon whether or not the direction of the steering torque for the lane keep control agrees with the direction of the steering torque based on the driver's steering operation. Furthermore, the predetermined value is also variably controlled according to the vehicle speed V and the curvature of the curve (1/R). The operation will be specifically described below with reference to the flowchart shown in FIG. 2. The two steering torques are torques applied to the steering mechanism for steering (steerage), and they are set as those corresponding to each other so as to permit a comparison between them. For example, in the case of the present embodiment, the steering torque by the driver is detected by the steering wheel torque sensor 10. For this reason, a value equivalent to the output from the steering wheel torque sensor is used as a steering torque to be generated for the lane keep control by the motor 15.

First, the processor detects white lines in image data taken by the CCD camera 8 and detects a forward route (lane) (step 200). Then the control unit calculates a target steering torque (steering torque applied to the steering system by the motor 15) Tt for keeping the lane, based on the detected lane (step 205). This target torque is calculated based on the curve curvature (1/R), offset D, and yaw angle θ, as described previously. The target steering torque Tt is set so that one in the case of right steering is positive and one in the case of left steering is negative. A method of calculating the controlled variable for keeping the lane, based on the forward driving route ahead vehicle 1 can be selected from the well-known methods.

Then the control unit acquires the vehicle speed V detected by the vehicle speed sensor 11, the curve curvature (1/R) calculated at step 200 described above, and the steering torque T by the driver detected by the steering wheel torque sensor 10 (step 210). This steering torque T is also set so that one in the case of right steering is positive and one in the case of left steering is negative. Then the control unit calculates predetermined values as aforementioned determination thresholds (cornering inside threshold Ti and cornering outside threshold To) by use of Eqs (i) and (ii) below, based on these vehicle speed V, curve curvature (1/R), and driver's steering torque T (step 215). Each of the cornering inside threshold Ti and the cornering outside threshold To is set as a positive value.

$$Ti = \alpha \cdot V^2/R \quad \text{(i)};$$

$$To = \beta \cdot V^2/R \quad \text{(ii)}$$

[where $\alpha$ and $\beta$ are constants, $\alpha > \beta > 0$]

The cornering inside threshold Ti is the predetermined value in a case where the steering operation by the driver is effected to the cornering inside relative to the cornering by the lane keep control, i.e., where the direction of the steering torque by the lane keep control agrees with the direction of the steering torque by the driver. On the other hand, the cornering outside threshold To is the predetermined value in a case where the steering operation by the driver is effected to the cornering outside relative to the cornering by the lane keep control, i.e., where the direction of the steering torque by the lane keep control does not agree with the direction of the steering torque by the driver. As apparent from the magnitude relation between the constants $\alpha$ and $\beta$, Ti>To, i.e., the cornering inside threshold Ti in the case where the directions of the foregoing two steering torques agree is set larger than the cornering outside threshold To where they do not agree.

After step 215, it is determined whether the radius of curvature of the curve is less than 1000 m (step 220). When step 220 results in answering no, the control unit performs a control intervention determination for the case where the forward route is straight (step 225). The details of this determination are not described herein, but the determination herein is made so that the driver's steering operation to cornering of the vehicle is determined similarly irrespective of the right side and the left side. On the other hand, when step 220 results in answering yes, it is first determined in order to perform a control intervention determination for a curve, whether the conditions that the target steering torque Tt>0 and that the driver's steering torque T>0 are both satisfied (step 230). Namely, it is determined herein whether the direction of the torque of steering to be done by the lane keep control and the direction of the steering torque by the driver both are the steering (steerage) to the right.

When step 230 results in answering no, the control unit then determines whether the conditions that the target steering torque Tt$\leq$0 and that the driver's steering torque T$\leq$0 are satisfied (step 235). Namely, it is determined herein whether the direction of the torque of steering to be carried out by the lane keep control and the direction of the steering torque by the driver both are the steering (steerage) to the left [the inequality sign includes the case of=0 for convenience' sake]. When step 230 or step 235 is yes, the directions of the two steering torques agree with each other. In this case, whether intervention in the control is present is determined using the aforementioned cornering inside threshold Ti. Specifically, it is determined whether the magnitude (=absolute value) of the steering torque T by the driver exceeds the cornering inside threshold Ti (step 240). Since the magnitude of the steering torque T is used herein, it is feasible to judge the both left and right cornerings.

When step 240 results in answering yes, it is determined that the intervention in the control is present, and then the lane keep control is terminated to cancel the output of motor 15 corresponding to the lane keep control (step 250). Since the motor 15 also functions as an actuator of an ordinary electric power steering, the motor 15 is not necessarily stopped herein. When step 240 results in answering no, it is determined that the intervention in the control is absent, on the assumption that even if driver's steering is carried out, the steering operation is just an additional steering operation necessary for the lane keep control or a steering operation at a level without intension to intervene in the control (step 255). In this case, the motor 15 is driven so as to generate the target steering torque Tt calculated at step 205.

On the other hand, when step 235 results in answering no, the directions of the two steering torques do not agree with each other. In this case, whether the intervention in the control is present is determined using the aforementioned cornering outside threshold To. Specifically, it is determined whether the magnitude (=absolute value) of the driver's steering torque T exceeds the cornering outside threshold To (step 245). When step 245 results in answering yes, it is determined that the intervention in the control is present, and the lane keep control is terminated to cancel the output of motor 15 corresponding to the lane keep control (step 250). When step 245 results in answering no, it is determined that the intervention in the control is absent, on the assumption that even if the driver performs a steering operation, the steering operation is at a level without intension to intervene in the control (step 255). In this case, the motor 15 is driven so as to generate the target steering torque Tt calculated at step 205.

When the cornering inside threshold Ti in the case where the directions of the aforementioned two steering torques (the target steering torque Tt by the lane keep control and the steering torque T by the driver) agree with each other is set larger than the cornering outside threshold To in the case where they do not agree, as described above, the determination that the intervention in the control is present is not made unless the driver applies a larger steering torque in the case where they agree. In other words, it is determined in the disagreement case that the intervention in the control is present, when the driver applies only a relatively small steering torque. When the directions of the torques do not agree with each other, it is apparent that the driver is against the control, and thus the intervention in the control can be determined earlier. On the other hand, when the directions of the torques agree with each other, the predetermined value is set larger to secure a margin before making the determination on the intervention in the control, whereby the system is prevented from frequently determining that the intervention in the control is present. This permits the system to judge the intervention in the control appropriately (in a good balance) according to the circumstances in the agreement case and in the disagreement case.

Furthermore, the thresholds are variably set according to the vehicle speed V and the curve curvature (1/R), without changing the magnitude relation between the cornering inside threshold Ti and the cornering outside threshold To. In this example, they are proportional to the square of the vehicle speed V and proportional to the curve curvature (1/R) [i.e., inversely proportional to the radius of curvature R]. In consequence, as the vehicle speed V increases, the determination that the driver's intervention in the control is present becomes less likely to be made unless the driver applies a larger steering torque. During driving on a curve, the steering torque necessary for cornering increases with increase in the vehicle speed. For this reason, the thresholds are set to increase on the basis of the vehicle speed in order to suppress the frequent stop of the control, and the driver's steering operation is prioritized more accurately when it should be prioritized to the driving support control.

The larger the curvature (1/R) of the curve (i.e., the smaller the radius of curvature of the curve), the tighter the curve; therefore, a greater steer angle is needed with increase in the curvature (1/R) of the curve. For this reason, the determination that the driver's intervention in the control is present is not made unless the driver applies a greater steering torque (steer angle) with increase in the curvature (1/R) of the curve; whereby the driver's steering operation can be prioritized more accurately when it should be prioritized to the driving support control.

In the present embodiment the motor 15 is an actuator for steering the steered wheels FR, FL. The CCD camera 8 functions as an image taking means. The image processor 9 and ECU 2 function as a controlling means. ECU 2 also functions as a control suppressing means.

The driving support system of the present invention is not limited to the above-described embodiment. For example, the above-described embodiment was arranged to compare the two steering torques on the basis of the equivalent values of the steering wheel torque sensor 10, but the comparison may be made by use of other values. At this time, the values used in the comparison do not have to indicate the torques themselves (e.g., electric energy supplied to the motor 15 or the like), and they can be deemed as values indicating the steering torques as long as they can be handled as equivalents to the steering torques.

In the above-described embodiment, when the predetermined values as the determination thresholds are variably controlled according to the parameter associated with the curvature of the curve, this parameter is the curvature (1/R) of the curve itself. However, it is also possible to use another parameter associated with the curvature of the curve except for the curvature of the curve. The present invention involves acquiring this parameter on the basis of the forward image, but it is also possible to acquire the parameter associated with the curvature of the curve from the yaw rate generated in the vehicle and to variably set the predetermined values on the basis thereof, with like effect.

What is claimed is:

1. A driving support system with an actuator for steering a steered wheel, which performs a driving support control of a vehicle to apply an additional torque to a steering mechanism incorporating the steered wheel, by means of the actuator to steer the steered wheel, the driving support system comprising:
   image taking means for taking a forward image ahead the vehicle;
   controlling means for determining the additional torque to be applied to the steering mechanism on the basis of the forward image acquired by the image taking means and for driving the actuator so as to generate the determined torque, thereby performing the driving support control;
   steering wheel torque detecting means for detecting a steering wheel torque applied on a steering wheel by a driver; and
   control suppressing means for prioritizing a steering operation by the driver to the driving support control when a magnitude of the steering wheel torque detected by the steering wheel torque detecting means is not less than a predetermined value,
   wherein the control suppressing means sets the predetermined value so that the predetermined value in a case where a direction of the steering torque for the driving support control determined by the controlling means agrees with a direction of the steering wheel torque detected by the steering wheel torque detecting means is larger than the predetermined value in a case where the direction of the steering torque does not agree with the direction of the steering wheel torque.

2. The driving support system according to claim 1, wherein the control suppressing means terminates the driving support control when the steering wheel torque detected by the steering wheel torque detecting means is not less than the predetermined value.

3. The driving support system according to claim 1, further comprising vehicle speed detecting means for detecting a speed of the vehicle,
   wherein the control suppressing means variably controls the predetermined value in accordance with the vehicle speed detected by the vehicle speed detecting means, and sets the predetermined value so that the predetermined value increases with increase in the vehicle speed.

4. The driving support system according to claim 1, wherein the controlling means detects a parameter associated with a curvature of a curve ahead the vehicle on the basis of the forward image acquired by the image taking means, and
   wherein the control suppressing means variably controls the predetermined value in accordance with the parameter associated with the curvature of the curve, and sets the predetermined value so that the predetermined value increases with increase in the curvature of the curve.

5. The driving support system according to claim 4, wherein the control suppressing means variably controls the predetermined value in accordance with the vehicle speed as well as the parameter associated with the curvature of the curve, and sets the predetermined value so that the predetermined value increases with increase in the vehicle speed.

6. The driving support system according to claim 5, wherein the actuator is a motor for changing a steer angle of the steered wheel, and the image taking means is a camera, and
   wherein the controlling means detects a driving lane from the forward image acquired by the camera and drives the motor so as to prevent the vehicle from departing from the driving lane on the basis of the detected driving lane.

7. The driving support system according to claim 6, further comprising a navigation system, wherein the controlling means uses the navigation system together in detecting the driving lane.

8. The driving support system according to claim 6, wherein the controlling means performs an assist control to make the motor generate only a part of a steering torque necessary for keeping the driving lane.

9. A driving support method with an actuator for steering a steered wheel by means of an actuator to apply an additional torque to a steering mechanism incorporating the steered wheel;
   wherein a forward image ahead the vehicle is taken;
   the additional torque to be applied to the steering mechanism is determined on the basis of the forward image acquired and thereby the driving support control is performed so as to generate the determined torque with the actuator;
   a steering wheel torque applied on a steering wheel by a driver is detected; and a steering operation by the driver to the driving support control is prioritized when a magnitude of the steering wheel torque detected by the steering wheel torque detecting means is not less than a predetermined value, wherein the predetermined value is set so that the predetermined value in a case where a direction of the steering torque for the driving support control agrees with a direction of the steering wheel torque is larger than the predetermined value in a case where the direction of the steering torque does not agree with the direction of the steering wheel torque.

10. The driving support method according to claim 9, wherein the driving support control is terminated when the steering wheel torque detected is not less than the predetermined value.

11. The driving support method according to claim 9, wherein a speed of the vehicle is detected, and wherein the predetermined value is variably controlled in accordance with the vehicle speed and the predetermined value is set so that the predetermined value increases with increase in the vehicle speed.

12. The driving support method according to claim 9, wherein a parameter is detected associated with a curvature of a curve ahead the vehicle on the basis of the forward image acquired, and wherein the predetermined value is variably controlled in accordance with the parameter associated with the curvature of the curve and the predetermined value is set so that the predetermined value increases with increase in the curvature of the curve.

13. The driving support method according to claim 12, wherein the predetermined value is variably controled in accordance with the vehicle speed as well as the parameter associated with the curvature of the curve, and the predetermined value is set so that the predetermined value increases with increase in the vehicle speed.

14. The driving support method according to claim 13, wherein the actuator is a motor for changing a steer angle of the steered wheel, and the forward image is taken by means of a camera, and wherein a driving lane is detected from the forward image acquired by the camera and the motor is driven so as to prevent the vehicle from departing from the driving lane on the basis of the detected driving lane.

15. The driving support method according to claim 14, wherein a navigation system is used together in detecting the driving lane.

16. The driving support method according to claim 14, wherein an assist control is made to make the motor generate only a part of a steering torque necessary for keeping the driving lane.

* * * * *